(12) United States Patent
Choi (10) Patent No.: US 11,185,169 B2
(45) Date of Patent: Nov. 30, 2021

(54) COUPLER AND COLLAPSIBLE BED FRAME HAVING SAME

(71) Applicant: Inno-Sports Co., Ltd., Xiamen (CN)

(72) Inventor: Kwan Jun Choi, Xiamen (CN)

(73) Assignee: Inno-Sports Co., Ltd., Xiamen (CN)

( * ) Notice: Subject to any disclaimer, the term of this patent is extended or adjusted under 35 U.S.C. 154(b) by 336 days.

(21) Appl. No.: 16/432,168

(22) Filed: Jun. 5, 2019

(65) Prior Publication Data

US 2019/0387893 A1    Dec. 26, 2019

(30) Foreign Application Priority Data

Jun. 21, 2018  (CN) .......................... 201820959313.3

(51) Int. Cl.
| | |
|---|---|
| *A47C 19/12* | (2006.01) |
| *A47C 19/00* | (2006.01) |
| *F16B 12/56* | (2006.01) |
| *A47C 19/02* | (2006.01) |

(52) U.S. Cl.
CPC .......... *A47C 19/126* (2013.01); *A47C 19/005* (2013.01); *A47C 19/027* (2013.01); *F16B 12/56* (2013.01)

(58) Field of Classification Search
CPC ... A47C 19/027; A47C 19/025; A47C 19/005; A47C 19/122; A47C 19/12; A47C 19/04; F16B 13/54; F16B 13/56; F16B 9/05; A47B 95/002
See application file for complete search history.

(56) References Cited

U.S. PATENT DOCUMENTS

| | | | |
|---|---|---|---|
| 273,332 A | 3/1883 | Woodin | |
| 277,541 A | 5/1883 | Bowers | |
| 372,913 A | 11/1887 | Hopkins | |
| 557,997 A | 4/1896 | Nessel | |
| 687,238 A | 11/1901 | Johnson | |

(Continued)

FOREIGN PATENT DOCUMENTS

| | | |
|---|---|---|
| DE | 102018130110 A1 | 5/2020 |
| EP | 2182151 A2 | 5/2010 |

OTHER PUBLICATIONS

U.S. Appl. No. 16/432,017, filed Jun. 5, 2019.

(Continued)

*Primary Examiner* — Robert G Santos
*Assistant Examiner* — Alison N Labarge
(74) *Attorney, Agent, or Firm* — Morgan, Lewis & Bockius LLP (57) ABSTRACT

A collapsible bed frame includes a first lateral bar unit, a second lateral bar unit, and a longitudinal supporting bar unit. The first and second lateral bar units are disposed substantially parallel to each other. The first lateral bar unit includes a first coupler to removably couple with a first end of the longitudinal supporting bar unit. The second lateral bar unit includes a second coupler to removably couple with a second end of the longitudinal supporting bar unit. The collapsible bed frame also includes first and second longitudinal bar units. The first longitudinal bar unit is rotatably connected with the first ends of the first and second lateral bar units. The second longitudinal bar unit is rotatably connected with the second ends of the first and second lateral bar units.

20 Claims, 6 Drawing Sheets

(56) References Cited

U.S. PATENT DOCUMENTS

| | | | |
|---|---|---|---|
| 705,384 A | 7/1902 | Cooper |
| 736,569 A | 8/1903 | Webb |
| 746,211 A | 12/1903 | Webb |
| 797,011 A | 8/1905 | Mosier |
| 984,823 A | 2/1911 | Linden |
| 1,072,550 A | 9/1913 | Wilson |
| 1,694,420 A | 12/1928 | Joselowitz |
| 1,806,358 A | 5/1931 | Manly |
| 1,833,692 A | 11/1931 | Silvio |
| 2,057,334 A | 10/1936 | Hannum |
| 2,492,070 A | 12/1949 | Stone et al. |
| 2,602,012 A | 7/1952 | Doty |
| 2,680,252 A | 6/1954 | Hatton |
| 2,772,424 A | 12/1956 | Roche |
| 2,782,075 A | 2/1957 | Roscoe |
| 2,823,392 A | 2/1958 | Howard |
| 2,905,513 A | 9/1959 | Kane |
| 2,962,085 A | 11/1960 | Frank |
| 2,983,931 A | 5/1961 | Nelson |
| 3,245,363 A | 4/1966 | Kanitz |
| 3,296,983 A | 1/1967 | Brush |
| 3,504,877 A * | 4/1970 | Lyon, Sr. | A47B 13/021 248/188 |
| 3,605,142 A | 9/1971 | Weinhart |
| 3,613,132 A | 10/1971 | Weinhart |
| 3,657,748 A | 4/1972 | Weinhart |
| 3,984,884 A | 10/1976 | Spitz |
| 4,431,164 A | 2/1984 | Jungo et al. |
| 4,745,644 A | 5/1988 | Pottschmidt |
| 4,788,727 A | 12/1988 | Liu |
| 4,974,526 A | 12/1990 | Wiygul, Jr. |
| 5,469,589 A | 11/1995 | Steed |
| 5,562,050 A | 10/1996 | Colquhoun |
| 5,884,566 A | 3/1999 | Chen |
| 5,943,968 A | 8/1999 | Dobson |
| 6,449,786 B1 * | 9/2002 | Voit | A47C 19/005 403/230 |
| 6,485,219 B1 | 11/2002 | Beyer |
| 7,003,822 B1 * | 2/2006 | Sheehy | A47C 19/005 5/200.1 |
| 7,376,986 B2 | 5/2008 | Smith |
| 7,690,316 B2 | 4/2010 | Yoo |
| 7,739,760 B2 | 6/2010 | Smith |
| 7,784,122 B2 | 8/2010 | Oh |
| RE41,763 E | 9/2010 | Ng |
| 7,845,030 B1 | 12/2010 | Pollard |
| 8,006,328 B2 | 8/2011 | Polevoy |
| 8,006,329 B2 | 8/2011 | Oh |
| 8,042,205 B2 | 10/2011 | Schulz, Jr. |
| 8,176,581 B2 | 5/2012 | Schulz, Jr. |
| 8,678,490 B2 | 3/2014 | Chen |
| 8,822,885 B2 | 9/2014 | Daneshvar |
| 8,832,876 B1 | 9/2014 | Oh |
| 8,935,819 B1 | 1/2015 | Hartley |
| 8,978,176 B1 | 3/2015 | Oh |
| 8,990,979 B1 | 3/2015 | Craver |
| 9,021,964 B2 | 5/2015 | Peng |
| 9,332,833 B2 | 5/2016 | Kim |
| 9,596,943 B1 | 3/2017 | Hartley |
| 9,924,804 B2 | 3/2018 | Hartley |
| 10,321,767 B2 | 6/2019 | Jin |
| 10,687,630 B1 | 6/2020 | Hartley |
| 10,702,070 B2 | 7/2020 | Oh |
| 10,959,529 B2 | 3/2021 | Choi |
| 10,959,530 B2 | 3/2021 | Choi |
| 10,966,537 B1 * | 4/2021 | Denney | A47C 19/025 |
| 2006/0107456 A1 * | 5/2006 | Joseph | A47C 17/58 5/2.1 |
| 2008/0109958 A1 | 5/2008 | Wang |
| 2009/0025143 A1 | 1/2009 | Oh |
| 2010/0170190 A1 | 7/2010 | Schulz, Jr. |
| 2010/0171342 A1 | 7/2010 | Chen |
| 2010/0235989 A1 | 9/2010 | Jin |
| 2010/0275372 A1 | 11/2010 | Oh |
| 2010/0299831 A1 * | 12/2010 | Lee | A47C 19/126 5/202 |
| 2011/0258777 A1 | 10/2011 | Schulz, Jr. |
| 2012/0204770 A1 | 8/2012 | Grace |
| 2012/0304380 A1 | 12/2012 | Jin |
| 2013/0000038 A1 | 1/2013 | Schulz, Jr. |
| 2013/0025051 A1 | 1/2013 | Syrowitz |
| 2014/0208506 A1 | 7/2014 | Bartelsmeyer |
| 2016/0143446 A1 | 5/2016 | Hartley |
| 2016/0255963 A1 | 9/2016 | Jones |
| 2016/0296004 A1 | 10/2016 | Peng |
| 2018/0042391 A1 | 2/2018 | Oh |
| 2018/0055235 A1 | 3/2018 | Choi |
| 2018/0116412 A1 | 5/2018 | Jin |
| 2018/0140103 A1 * | 5/2018 | Thompson | A47C 19/025 |
| 2019/0387888 A1 | 12/2019 | Choi |
| 2019/0387889 A1 | 12/2019 | Choi |
| 2019/0387890 A1 | 12/2019 | Choi |
| 2019/0387891 A1 | 12/2019 | Choi |
| 2019/0387892 A1 | 12/2019 | Choi |
| 2019/0387893 A1 | 12/2019 | Choi |
| 2020/0022501 A1 | 1/2020 | Choi |
| 2020/0022502 A1 | 1/2020 | Choi |
| 2020/0022503 A1 | 1/2020 | Choi |
| 2020/0146438 A1 | 5/2020 | Choi |
| 2020/0378426 A1 | 12/2020 | Choi |

OTHER PUBLICATIONS

U.S. Appl. No. 16/432,046, filed Jun. 5, 2019.
U.S. Appl. No. 16/432,075, filed Jun. 5, 2019.
U.S. Appl. No. 16/432,098, filed Jun. 5, 2019.
U.S. Appl. No. 16/432,131, filed Jun. 5, 2019.
U.S. Appl. No. 16/506,525, filed Jul. 9, 2019.
U.S. Appl. No. 16/601,308, filed Oct. 14, 2019.

* cited by examiner

COUPLER AND COLLAPSIBLE BED FRAME HAVING SAME

CROSS-REFERENCE TO RELATED APPLICATIONS

The present application claims priority to Chinese Utility Model Application CN 201820959313.3 filed Jun. 21, 2018. The disclosure of the application is incorporated herein for all purposes by reference in its entirety.

FIELD OF THE INVENTION

The present invention generally relates to bed frames and beds, and more particularly, to couplers, collapsible bed frames and beds having collapsible bed frames.

BACKGROUND

Many existing foldable bed frames are not user-friendly. For instance, installation of supporting bars often requires one to position these bars at slant angles and then push hard to couple with bars with other bars. Moreover, bars of a bed frame are usually made of a metallic material. They often generate noises during installation, and might be worn down quickly due to the friction between the bars. This could result in loosened connections between the bars, and consequently, lower stability and shortened lifetime of the bed frames.

Given the current state of the art, there remains a need for collapsible beds and bed frames that address the abovementioned issues.

The information disclosed in this Background section is provided for an understanding of the general background of the invention and is not an acknowledgement or suggestion that this information forms part of the prior art already known to a person skilled in the art.

SUMMARY OF THE INVENTION

The present invention provides couplers, collapsible bed frames and beds having such collapsible bed frames.

In various exemplary embodiments, the present invention provides a collapsible bed frame including a first frame unit and a second frame unit disposed side by side. Each of the first and second units includes an upper frame, a lower frame, a first vertical bar disposed between the upper and lower frames, and a first plastic coupler connected with the first vertical bar at an interior side of the first or second frame unit. The collapsible bed frame also includes an inner lateral bar unit disposed between the first and second frame units. The inner lateral bar unit includes an upper inner lateral bar, a lower inner lateral bar, a second vertical bar, and one or more second plastic couplers. The second vertical bar is disposed between the upper and lower inner lateral bar and at a position corresponding to the first vertical bar. A second plastic coupler in the one or more second plastic couplers is connected with the second vertical bar at a side facing the first plastic coupler. The collapsible bed frame further includes one or more longitudinal supporting bar units, each removably connected with the inner lateral bar and one of the first and second frames through the first and second plastic couplers. Each longitudinal supporting bar unit includes an upper longitudinal supporting bar, a lower longitudinal supporting bar, and one or more third vertical bars disposed between the upper and lower longitudinal supporting bars and connecting the upper and lower longitudinal supporting bars. The first plastic coupler includes a first upper receptacle to removably engage a first end of the upper longitudinal supporting bar, and a first lower receptacle to removably engage a first end of the lower longitudinal supporting bar. The corresponding second plastic coupler includes a second upper receptacle to removably engage a second end of the upper longitudinal supporting bar, and a second lower receptacle to removably engage a second end of the lower longitudinal supporting bar.

In some exemplary embodiments, the upper longitudinal supporting bar is longer than the lower longitudinal supporting bar. Each of the first and second plastic couplers includes a recess formed at an upper portion of the first or second plastic coupler to serve as the first or second upper receptacle. Each of the first and second plastic couplers includes a first side wall, a second side wall and a lower side wall at a lower portion of the first or second plastic coupler, and protruded in a longitudinal direction of the bed frame. The first side wall, the second side wall and the lower side wall collectively serve as the first or second lower receptacle.

In an exemplary embodiment, the first plastic coupler is fixed on the first vertical bar by a fastener.

In some exemplary embodiments, the first or second end of the upper longitudinal supporting bar includes a third plastic coupler configured to be removably disposed at the first or second upper receptacle. The first or second end of the lower longitudinal supporting bar includes a fourth plastic coupler configured to be removably disposed at the first or second lower receptacle.

In various exemplary embodiments, the first and second frame units are rotatably connected with each other at proximal sides thereof. Each of the first and second frame units includes an outer lateral bar unit, a first longitudinal bar unit, and a second longitudinal bar unit. The first longitudinal bar unit is disposed at a first side of the bed frame and rotatably connected with a first end of the outer lateral bar unit. The second longitudinal bar unit is disposed at a second side of the bed frame and rotatably connected with a first end of the outer lateral bar unit. Each of the first and second longitudinal bar units includes a first longitudinal segment unit and a second longitudinal segment unit rotatably connected with each other at proximal ends thereof. When in an intermediate state between contracted and expanded states, the first longitudinal bar units of the first and second frame units collectively form a substantially "W" shape, and the second longitudinal bar units of the first and second frame units collectively form another substantially "W" shape.

In some exemplary embodiments, a collapsible bed frame further includes a plurality of lateral supporting bars. Each lateral supporting bar has a first end removably connected with the first longitudinal bar unit of the first or second frame unit, and a second end removably connected with the second longitudinal bar unit of the first or second frame unit. Each of the first and second longitudinal bar units includes an upper longitudinal bar, a lower longitudinal bar, and a plurality of fourth vertical bars disposed at an interior side of the bed frame and connected with the upper and lower longitudinal bars. Each fourth vertical bar is formed with a slot at an upper portion thereof. A fifth plastic coupler is disposed at the slot. Each of the first and second ends of a lateral supporting bar in the plurality of lateral supporting bars includes a coupler having one or more lugs to removably couple with the fifth plastic coupler.

In some exemplary embodiments, the slot includes a bottom, a first side wall, a second side wall, a third side wall, a first extension and a second extension. The first side wall, the second wall, the third side wall, the first extension and a second extension are extended upward from the bottom. The first and second side walls are opposite to each other. The third side wall faces the upper longitudinal bar, and connects the first and second side walls. The first extension extends from the first side wall toward the second side wall. The second extension extends from the second side wall toward the first side wall. The first and second extensions are spaced apart with an opening in between. The fifth plastic coupler includes a first notch at a first side and a second notch at a second side of the fifth plastic coupler. The first and second notches correspond to the first and second extensions of the slot. The one or more lugs of the coupler includes a first lug and a second lug to removably couple with the first and second notches of the fifth plastic coupler, respectively.

In an exemplary embodiment, the first notch is shorter than the first extension, and the second notch is shorter than the second extension.

In various exemplary embodiments, the present invention provides a collapsible bed frame including a first frame unit and a second frame unit disposed side by side. Each of the first and second units includes an upper frame, a lower frame, a first vertical bar disposed between the upper and lower frames, and a first coupler connected with the first vertical bar at an interior side of the first or second frame unit. The first coupler includes an upper receptacle and a lower receptacle. The collapsible bed frame also includes a longitudinal supporting bar unit. The longitudinal supporting bar unit includes an upper longitudinal supporting bar, a lower longitudinal supporting bar, and one or more third vertical bars disposed between the upper and lower longitudinal supporting bars and connecting the upper and lower longitudinal supporting bars. A first end of the upper longitudinal supporting bar is removably coupled with the upper receptacle of the first coupler of the first frame unit. The first end of the lower longitudinal supporting bar is removably coupled with the lower receptacle of the first coupler of the first frame unit. A second end of the upper longitudinal supporting bar is removably coupled with the upper receptacle of the first coupler of the second frame unit. A second end of the lower longitudinal supporting bar is removably coupled with the lower receptacle of the second coupler of the first frame unit.

In various exemplary embodiments, the present invention provides a collapsible bed frame including a first lateral bar unit, a second lateral bar unit, a first longitudinal bar unit, a second longitudinal bar unit, and a first longitudinal supporting bar unit. The first and second lateral bar units are substantially parallel to each other. The first lateral bar unit includes a first upper lateral bar, a first lower lateral bar, a first vertical bar disposed between the first upper and lower lateral bars, and a first coupler connected with the first vertical bar at a side facing the second lateral bar unit. The second lateral bar unit includes a second upper lateral bar, a second lower lateral bar, a second vertical bar disposed between the second upper and lower lateral bars and at a position corresponding to the first vertical bar, and a second coupler connected with the second vertical bar at a side facing the first lateral bar unit. The first longitudinal bar unit is disposed at a first side of the bed frame, and has a first end connected with a first end of the first lateral bar unit and a second end connected with a first end of the second lateral bar unit. The second longitudinal bar unit is disposed at a second side of the bed frame, and has a first end connected with a second end of the first lateral bar unit and a second end connected with a second end of the second lateral bar unit. The first longitudinal supporting bar unit includes a first upper longitudinal supporting bar, a first lower longitudinal supporting bar, and one or more third vertical bars disposed between the first upper and lower longitudinal supporting bars and connecting the first upper and lower longitudinal supporting bars. The first coupler includes a first upper receptacle to removably engage a first end of the first upper longitudinal supporting bar, and a first lower receptacle to removably engage a first end of the first lower longitudinal supporting bar. The second coupler includes a second upper receptacle to removably engage a second end of the first upper longitudinal supporting bar, and a second lower receptacle to removably engage a second end of the first lower longitudinal supporting bar.

In some exemplary embodiments, the first and second couplers are made of a material comprising plastic.

In some exemplary embodiments, the first upper longitudinal supporting bar is longer than the first lower longitudinal supporting bar. Each of the first and second couplers includes a recess formed at an upper portion of the first or second coupler to serve as the first or second upper receptacle. Each of the first and second couplers also includes a first side wall, a second side wall and a lower side wall at a lower portion of the first or second coupler, and protruded in a longitudinal direction of the bed frame. The first side wall, the second side wall and the lower side wall collectively serve as the first or second lower receptacle.

In some exemplary embodiments, the first or second end of the first upper longitudinal supporting bar includes a third coupler configured to be removably disposed at the first or second upper receptacle. The first or second end of the first lower longitudinal supporting bar includes a fourth coupler configured to be removably disposed at the first or second lower receptacle.

In various exemplary embodiments, each of the first and second longitudinal bar units is rotatably connected with the first and second lateral bar units. Each of the first and second longitudinal bar units includes a first longitudinal segment unit and a second longitudinal segment unit rotatably connected with each other at proximal ends thereof. The proximal ends of the first and second longitudinal segment units of the first longitudinal bar unit and the proximal ends of the first and second longitudinal segment units of the second longitudinal bar unit move toward each other during contraction and move away from each other during expansion.

In some exemplary embodiments, a collapsible bed frame further includes a plurality of lateral supporting bars, each having a first end removably connected with the first longitudinal bar unit, and a second end removably connected with the second longitudinal bar unit. Each of the first and second longitudinal bar units includes an upper longitudinal bar, a lower longitudinal bar, and a plurality of fourth vertical bars disposed at an interior side of the bed frame and connected with the upper and lower longitudinal bars. Each fourth vertical bar is formed with a slot at an upper portion thereof. A fifth coupler is disposed at the slot. Each of the first and second ends of a lateral supporting bar in the plurality of lateral supporting bars includes a coupler having one or more lugs to removably couple with the fifth coupler.

In some exemplary embodiments, the slot includes a bottom, a first side wall, a second side wall, a third side wall, a first extension and a second extension. The first side wall, the second side wall, the third side wall, the first extension and a second extension are extended upward from the bottom. The first and second side walls are opposite to each other. The third side wall faces the upper longitudinal bar, and connects the first and second side walls. The first extension extends from the first side wall toward the second side wall. The second extension extends from the second side wall toward the first side wall. The first and second extensions are spaced apart with an opening in between. The fifth coupler includes a first notch at a first side and a second notch at a second side of the fifth coupler, wherein the first and second notches correspond to the first and second extensions of the slot. The one or more lugs of the coupler includes a first lug and a second lug to removably couple with the first and second notches of the fifth coupler, respectively.

In an exemplary embodiment, the first notch is shorter than the first extension, and the second notch is shorter than the second extension.

In various exemplary embodiments, a collapsible bed frame further includes a third lateral bar unit, a third longitudinal bar unit, a fourth longitudinal bar unit, and a second longitudinal supporting bar unit. The third lateral bar unit is disposed at a side of the second lateral bar unit opposite to the first lateral bar unit, and substantially parallel to the first and second lateral bar units. The third lateral bar unit includes a third upper lateral bar, a third lower lateral bar, a sixth vertical bar disposed between the third upper and lower lateral bars, and a sixth coupler connected with the sixth vertical bar at a side facing the second lateral bar unit. The second lateral bar unit further includes another second coupler connected with the second vertical bar at a side facing the third lateral bar unit. The third longitudinal bar unit is disposed at a first side of the bed frame, and has a first end connected with a first end of the third lateral bar unit and a second end connected with a first end of the second lateral bar unit. The fourth longitudinal bar unit is disposed at a second side of the bed frame, and has a first end connected with a second end of the third lateral bar unit and a second end connected with a second end of the second lateral bar unit. The second longitudinal supporting bar unit includes a second upper longitudinal supporting bar, a second lower longitudinal supporting bar, and one or more third vertical bars disposed between the second upper and lower longitudinal supporting bars and connecting the second upper and lower longitudinal supporting bars. The second longitudinal supporting bar unit is removably coupled with the second and third lateral bar units through the another second coupler at the second lateral bar unit and the sixth coupler at the third lateral bar unit.

In an exemplary embodiment, the third lateral bar unit is substantially the same as the first lateral bar unit. In another exemplary embodiment, the third lateral bar unit is substantially the same as the second lateral bar unit.

In some exemplary embodiments, the third longitudinal bar unit is substantially the same as the first longitudinal bar unit, and the fourth longitudinal bar unit is substantially the same as the second longitudinal bar unit.

In some exemplary embodiments, each of the first and second longitudinal bar units is rotatably connected with the first and second lateral bar units. Each of the third and fourth longitudinal bar units is rotatably connected with the second and third lateral bar units. Each of the first, second, third, fourth longitudinal bar units includes a first longitudinal segment unit and a second longitudinal segment unit rotatably connected with each other at proximal ends thereof. In an intermediate state between contracted and expanded states, the first and third longitudinal bar units collectively form a substantially "W" shape, and the second and fourth longitudinal bar units collectively form another substantially "W" shape.

The bed frames and beds of the present invention have other features and advantages that will be apparent from, or are set forth in more detail in, the accompanying drawings, which are incorporated herein, and the following Detailed Description, which together serve to explain certain principles of exemplary embodiments of the present invention.

BRIEF DESCRIPTION OF THE DRAWINGS

The accompanying drawings, which are incorporated into and constitute a part of this specification, illustrate one or more exemplary embodiments of the present invention and, together with the Detailed Description, serve to explain the principles and implementations of exemplary embodiments of the invention.

As will be apparent to those of skill in the art, the components illustrated in the figures described above are combinable in any useful number and combination. The figures are intended to be illustrative in nature and are not limiting.

DETAILED DESCRIPTION

Reference will now be made in detail to implementations of exemplary embodiments of the present invention as illustrated in the accompanying drawings. The same reference indicators will be used throughout the drawings and the following detailed description to refer to the same or like parts. Those of ordinary skill in the art will understand that the following detailed description is illustrative only and is not intended to be in any way limiting. Other embodiments of the present invention will readily suggest themselves to such skilled persons having benefit of this disclosure.

In the interest of clarity, not all of the routine features of the implementations described herein are shown and described. It will be appreciated that, in the development of any such actual implementation, numerous implementation-specific decisions are made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Many modifications and variations of the exemplary embodiments set forth in this disclosure can be made without departing from the spirit and scope of the embodiments, as will be apparent to those skilled in the art. The specific exemplary embodiments described herein are offered by way of example only, and the disclosure is to be limited only by the terms of the appended claims, along with the full scope of equivalents to which such claims are entitled.

Embodiments of the present invention are described in the context of collapsible bed frames and beds having one or more such collapsible bed frames. The collapsible beds and bed frames of the present invention can be of various sizes including but not limited to twin, full, queen and king sizes, and of various shapes including but not limited to rectangles and squares. They can be made of various materials including but not limited to metals (e.g., cast iron, steel, and aluminum), plastics and woods.

In general, a collapsible bed frame of the present invention includes one or more frame units, each capable of contracting and expanding while remaining on a plane defined by a top surface of the collapsible bed frame when it is expanded. The plane defined by the top surface of the collapsible bed frame when it is expanded is referred herein as the first plane. In various exemplary embodiments, the first plane is substantially parallel to the top surface of the collapsible bed frame when it is expanded. In some exemplary embodiments, the first plane is considered as the space defined by the top surface and the bottom surface of the collapsible bed frame when it is expanded.

A collapsible bed frame of the present invention can include a single frame unit, disclosed herein, that can contract and expand within the first plane. In various exemplary embodiments, a collapsible bed frame of the present invention includes two, three, four, or more frame units, of which adjacent frame units are disposed side by side and connected with each other. Each of these two, three, four, or more frame units can contract and expand while remaining on the first plane and connected with the other frame units. It should be noted that the two, three, four, or more frame units can have substantially the same configuration or different configurations as long as each of them can contract and expand while remaining on the first plane and connected with the other frame units.

Figure 1:
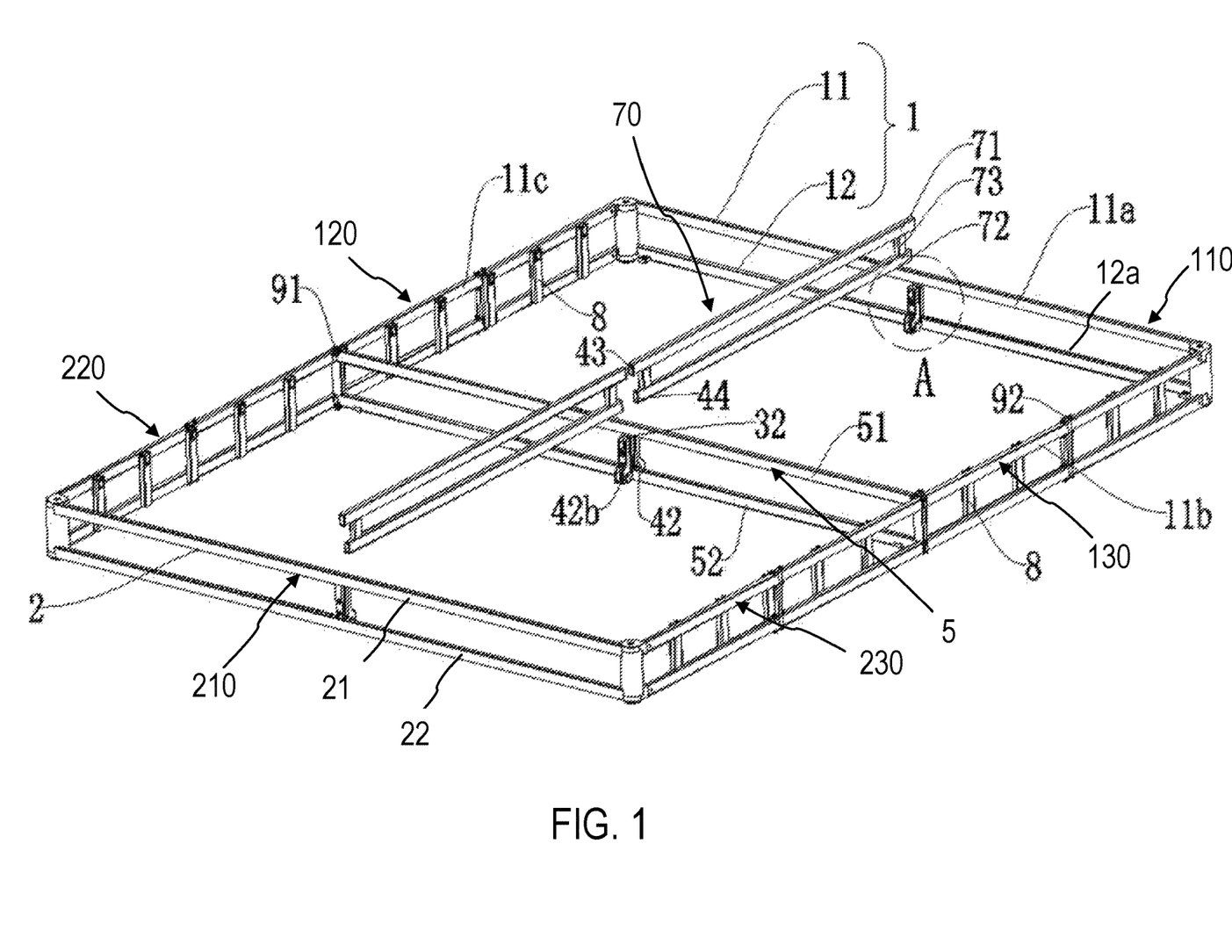
FIG. 1 is a partially disassembled perspective view illustrating an exemplary bed frame in an expanded state in accordance with exemplary embodiments of the present invention.
Figure 3:
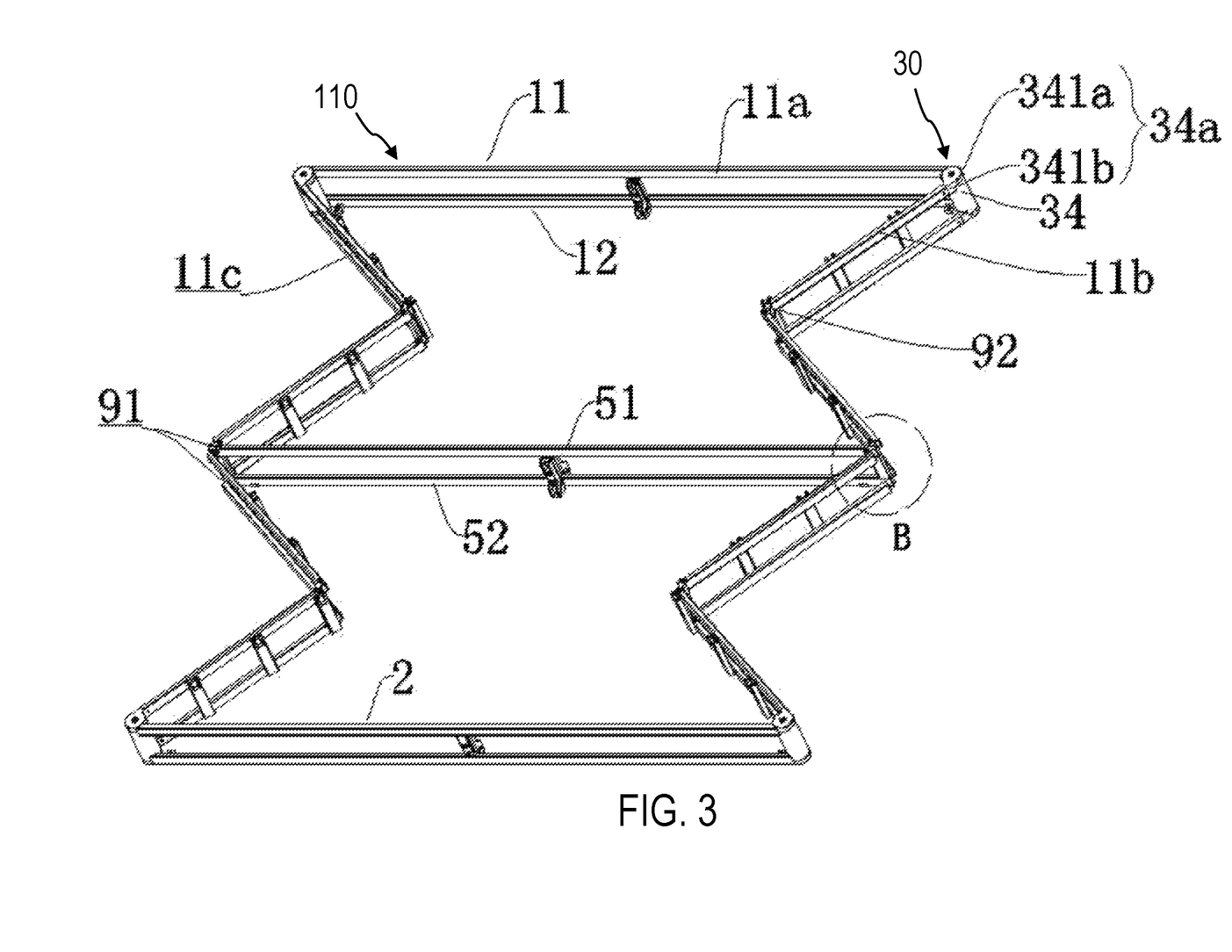
FIG. 3 is a perspective view illustrating an exemplary bed frame in an intermediate state in accordance with exemplary embodiments of the present invention.

By way of example, FIGS. 1 and 3 illustrate an exemplary collapsible bed frame in an expanded state and an intermediate state, respectively. The collapsible bed frame includes first frame unit 1 and second frame unit 2 disposed side by side and connected with each other at their proximal sides, i.e., the middle of the bed frame in FIG. 1. The sides opposite the proximal sides are referred to as the distal sides, which in some exemplary embodiments correspond to head and foot sides of the bed frame. The other two sides are referred to as left and right sides. It should be noted that the term "middle" as used herein does not necessarily mean the center of the bed frame, and the term "side" does not necessarily mean an outmost edge of the frame unit or an outmost edge of the bed frame. It should also be noted that first frame unit 1 and second frame unit 2 can be different, for instance, with one frame unit longer than the other in the longitudinal direction of the collapsible bed frame. By way of example, first frame unit 1 and second frame unit 2 in FIG. 1 are the same as or similar to each other, resulting in a substantially symmetric collapsible bed frame.

The top surface of the collapsible bed frame, when it is expanded, defines a plane, referred herein as the first plane. In some exemplary embodiments, the first plane is substantially parallel to the top surface of the bed frame when it is expanded. While remaining on the first plane, each of the first and second frame units can contract from the expanded state as illustrated in FIG. 1 to an intermediate state as illustrated in FIG. 3 and further contraction leads to a contracted state. The contraction process is reversible. For instance, while remaining on the same first plane, each of the first and second frame units can expand from the contracted state through the intermediate state as illustrated for exemplary embodiments in FIG. 3, to the expanded state as illustrated for exemplary embodiments in FIG. 1.

In various exemplary embodiments, a frame unit includes a plurality of bar units, where adjacent bar units are connected with each other and rotatable with respect to each other along one or more axes each substantially perpendicular to the first plane. For instance, two adjacent bar units can be connected with each other and rotatable with respect to each other along a single common axis substantially perpendicular to the first plane or along two different axes each substantially perpendicular to the first plane.

During contraction, at least a subset of bar units in the plurality of bar units retreats into an interior space defined by the collapsible bed frame when it is expanded. In various exemplary embodiments, the plurality of bar units of each frame unit moves toward the proximal sides of the frame units during contraction, and moves away from the proximal sides of the frame units during expansion. This allows multiple bar units to contract onto each other, and thus facilitates multiple bending and contracting of the collapsible bed frame. In many cases, when in an intermediate state between contracted and expanded states, bar units on one side of the collapsible bed frame collectively form a substantial "W" or other zigzag shape, and bar units on the opposite side of the collapsible bed frame, collectively forming another substantial "W" or other zigzag shape. In other words, bar units on each of these two sides are bended multiple times while connected with each other. This significantly reduces the contracted size of the collapsible bed frame without being disassembled. As such, it can be easily put to use with no need of cumbersome or complicated installation.

By way of example, FIGS. 1 and 3 illustrate an exemplary first frame unit 1 including first outer lateral bar unit 110, first longitudinal bar unit 120 and second longitudinal bar unit 130. First exemplary longitudinal bar unit 120 is disposed at a first side of the bed frame (e.g., left side in the figure) and second longitudinal bar unit 130 is disposed at a second side of the bed frame (e.g., right side in the figure). Similarly, second exemplary frame unit 2 includes second outer lateral bar unit 210, first longitudinal bar unit 220 and second longitudinal bar unit 230. First exemplary longitudinal bar unit 220 is disposed at the first side of the bed frame and second longitudinal bar unit 230 is disposed at the second side of the bed frame.

In some exemplary embodiments, a collapsible bed frame also includes inner lateral bar unit 5 disposed between first frame unit 1 and second frame unit 2. First exemplary longitudinal bar unit 120 has an end rotatably connected with a first end of first outer lateral bar unit 110, and the other end rotatably connected with a first end of inner lateral bar unit 5. Second exemplary longitudinal bar unit 130 has an end rotatably connected with a second end of first outer lateral bar unit 110, and the other end rotatably connected with a second end of inner lateral bar unit 5. First exemplary longitudinal bar unit 220 has an end rotatably connected with a first end of second outer lateral bar unit 210, and the other end rotatably connected with the first end of inner lateral bar unit 5. Second exemplary longitudinal bar unit 230 has an end rotatably connected with a second end of second outer lateral bar unit 210, and the other end rotatably connected with the second end of inner lateral bar unit 5.

In some exemplary embodiments, a longitudinal bar of a frame unit includes two or more longitudinal segment units, where adjacent segment units are connected with each other and rotatable with respect to each other along one or more axes each substantially perpendicular to the first plane. For instance, by way of example, FIGS. 1 and 3 illustrate each of exemplary longitudinal bar units 120, 130, 220 and 230 made of two longitudinal segment units rotatably connected with each other at their proximal ends by a connector such as connector 92. Exemplary connector 92 can be any suitable means, including but not limited to the exemplary connectors disclosed herein (e.g., first connector 91).

The rotatably connected proximal ends of two longitudinal segment units is referred to herein as a middle pivoting portion. The middle pivoting portion of first longitudinal bar unit 120 and the middle pivoting portion of second longitudinal bar unit 130 move toward each other during contraction, and move away from each other during expansion. Similarly, the middle pivoting portion of first longitudinal bar unit 220 and the middle pivoting portion of second longitudinal bar unit 230 move toward each other during contraction, and move away from each other during expansion. When in an intermediate state as illustrated in FIG. 3, first exemplary longitudinal bar units 120, 220 collectively form a substantial "W" shape, and second exemplary longitudinal bar units 130, 230 collectively form another substantial "W" shape. In other words, bar units on each of these two sides are bent multiple times while connected with each other. This significantly reduces the contracted size of the collapsible bed frame without its being disassembled. As such, it can be easily put to use with no need of cumbersome or complicated installation.

It should be noted that a frame unit can include a single frame, or a stack of frames that includes two, three or more frames arranged one over another. The two, three or more frames can be, but do not necessarily have to be, in direct contact. Similarly, a bar unit can include a single bar or a stack of bars. In additional, a bar can be a whole bar or made of two, three or more segments connected (fixed or movable) with each other. By way of example, FIG. 1 illustrates exemplary first frame unit 1 including upper frame 11 and lower frame 12 stacked one above another, and exemplary second frame 2 including upper frame 21 and lower frame 22 stacked one above another. FIG. 1 also illustrates exemplary inner lateral bar unit 5 having upper lateral bar 51 and lower lateral bar 52.

A collapsible bed frame also includes a plurality of couplers to couple the bars. In various exemplary embodiments, a coupler is a structure element that is sufficiently strong to hold bar(s) in place and is relatively soft/pliable (e.g., compared to metals) to serve as a cushion between bars and thus reduce friction between bars. In some exemplary embodiments, such a coupler is referred to as a "plastic coupler", which can be made of any suitable material. Plastic is an exemplary material. In some exemplary embodiments, one or more of the couplers are made of a material that can be shaped or molded. In some exemplary embodiments, a coupler is configured to cushion components connected thereto, thereby reducing friction between the connected components and the connected components and the coupler. In an exemplary embodiment, the coupler enhances the longevity and useful lifetime of the product into which they are incorporated.

In some exemplary embodiments, a bar unit of a collapsible bed frame include a coupler (e.g., a plastic coupler) configured to removably engage an end of a supporting bar unit. The coupler is formed with one, two, three or more receptacles, each receptacle configured to removably engage an end of a supporting bar of the supporting bar unit. For instance, in some exemplary embodiments where a supporting bar unit includes an upper bar and a lower bar, the coupler is formed with an upper receptacle to removably connect the upper bar and a lower receptacle to removably connect the lower bar of the supporting bar unit. The coupler facilitates easy installation of supporting bar units that can be used to support a mattress or the like. It also facilitates easy removal of the supporting bar units and thus allow the bed frame to contract.

Figure 2:
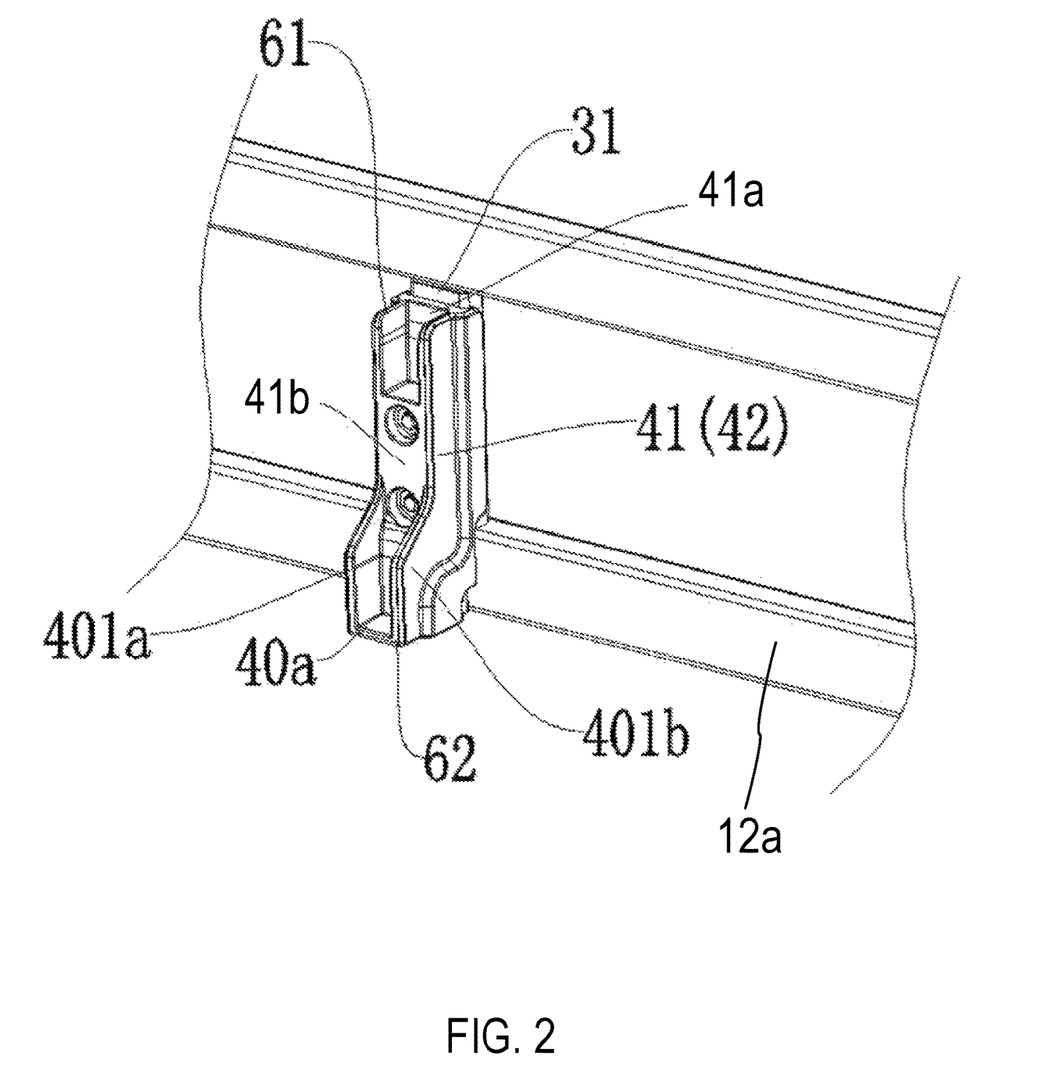
FIG. 2 is an enlarged view taken along circle A of FIG. 1.

By way of example, FIGS. 1 and 2 illustrate each of exemplary first outer lateral bar unit 110, exemplary second outer lateral bar unit 210 and exemplary inner lateral bar unit 5 including an upper bar, a lower bar and a vertical bar disposed between the upper and lower bars of the respective lateral bar unit. For instance, exemplary first outer lateral bar unit 110 includes upper bar 11*a*, lower bar 12*a*, and first vertical bar 31 disposed between the upper and lower bars of first outer lateral bar unit 110. Exemplary inner lateral bar unit 5 includes upper bar 51, lower bar 52, and second vertical bar 32 disposed between the upper and lower bars of inner lateral bar unit 5. First exemplary vertical bar 31 and second exemplary vertical bar 32 can be configured substantially the same as each other or differently from each other. In some exemplary embodiments, the vertical bar has an upper end fixedly connected with the upper bar and a lower end fixedly connected with the lower bar of the respective lateral bar unit, by welding or any other suitable joining means.

FIGS. 1 and 2 also illustrate one or more couplers (e.g., plastic couplers) disposed at each of the vertical bars. For instance, a coupler such as exemplary first coupler 41 is disposed at first vertical bar 31 and in an interior side of the bed frame (e.g., at a side facing inner lateral bar unit 5). A coupler such as exemplary second coupler 42 is disposed at second vertical bar 32 and at a side facing first outer lateral bar unit 110. Exemplary first coupler 41 and exemplary second coupler 42 are configured to removably engage a longitudinal supporting bar unit such as longitudinal supporting bar unit 70. In some exemplary embodiments, another coupler (e.g., plastic coupler) such as coupler 42*b* is disposed at second vertical bar 32 and at a side facing second outer lateral bar unit 210. Exemplary coupler 42*b* and a coupler disposed at second outer lateral bar unit 210 are configured to removably engage another longitudinal supporting bar unit. The coupler disposed at second outer lateral bar unit 210 can be termed as a sixth coupler (e.g., sixth plastic coupler). In an exemplary embodiment, it is configured the same as coupler 41 and second coupler 42.

In one embodiment, first exemplary coupler 41, second exemplary coupler 42, and exemplary coupler 42*b* can be configured substantially the same as or different from each other. In various exemplary embodiments, first exemplary coupler 41, second exemplary coupler 42, and exemplary coupler 42*b* are configured substantially the same as each other. In some exemplary embodiments, exemplary coupler 41, 42, or 42*b*, or a combination thereof, is fixed onto the respective vertical bar, for instance, by a fastener, e.g., a screw, bolt, or the like.

In some exemplary embodiments, first exemplary coupler 41 includes one, two, three or more receptacles, each receptacle configured to removably engage an end of a supporting bar of a supporting bar unit. By way of example, FIGS. 1 and 2 illustrate first exemplary coupler 41 including upper receptacle 61 and lower receptacle 62. Upper receptacle 61 is formed to removably engage an end of an upper longitudinal supporting bar such as upper longitudinal supporting bar 71 of longitudinal supporting bar unit 70. Lower receptacle 62 is formed to removably engage an end of a lower longitudinal supporting bar such as lower longitudinal supporting bar 72 of longitudinal supporting bar unit 70.

In some exemplary embodiments, first exemplary coupler 41 includes a recess such as recess 41*a* formed at an upper portion of the exemplary coupler to serve as the upper receptacle. First exemplary coupler 41 also includes a first side wall such as wall 401*a*, a second side wall such as wall 401*b*, and a lower side wall such as wall 40*a* at a lower portion of the exemplary coupler. Wall 401*a*, wall 401*b*, and wall 40*a* are protruded generally in a longitudinal direction of the bed frame, e.g., toward inner lateral bar unit 5 in FIG. 1. Collectively, wall 401*a*, wall 401*b*, and wall 40*a* serve as the lower receptacle of first exemplary coupler 41. In an exemplary embodiment, first exemplary coupler 41 further includes a middle portion, such as middle portion 41*b*, between the upper and lower receptacles of first coupler 41. With respect to the front surface of middle portion 41*b*, upper receptacle 61 is recessed backward in the longitudinal direction of the bed frame while lower receptacle 62 is protruded forward in the longitudinal direction of the bed frame. Together, upper receptacle 61, middle portion 41*b*, and lower receptacle 62 form a stepwise structure.

Corresponding to the stepwise structures of first exemplary coupler 41 and second exemplary coupler 42, upper longitudinal supporting bar 71 of longitudinal supporting bar unit 70 is longer than lower longitudinal supporting bar 72 of longitudinal supporting bar unit 70. As such, the ends of longitudinal supporting bar unit 70 can be easily and directly inserted into the receptacles of the exemplary couplers. This is advantageous over the existing bed frames, where insertion of a longitudinal supporting bar unit requires positioning of the longitudinal supporting bar unit at a slant angle. In addition, first exemplary coupler 41 and second exemplary coupler 42 serve as cushions between the longitudinal supporting bar unit and the first outer or inner lateral bar unit. As a result, it reduces the friction between these parts and thus prevent them from wearing down quickly.

In some exemplary embodiments, a longitudinal supporting bar unit includes one or more vertical bars disposed between the first upper and lower longitudinal supporting bars and connecting the first upper and lower longitudinal supporting bars. For instance, by way of example, FIG. 1 illustrates longitudinal supporting bar unit 70 includes two third vertical bars 73 disposed between upper longitudinal supporting bar 71 and lower longitudinal supporting bar 72. In an exemplary embodiment, each third vertical bar 73 has an upper end fixedly connected with the upper longitudinal supporting bar and a lower end fixedly connected with the lower longitudinal supporting bar by welding or any other suitable means.

In some exemplary embodiments, the longitudinal supporting bar unit includes one or more couplers at each end that are configured in accordance with (e.g., mate with) the receptacle(s) of first coupler 41 or second coupler 42. For instance, by way of example, FIG. 1 illustrates longitudinal supporting bar unit 70 including third exemplary coupler 43 at an end of upper longitudinal supporting bar 71 that corresponds with (e.g., fits into) the upper receptacle of second exemplary coupler 42, and fourth exemplary coupler 44 at an end of lower longitudinal supporting bar 72 that corresponds with (e.g., fits into) the lower receptacle of second exemplary coupler 42. In some exemplary embodiments, longitudinal supporting bar unit 70 includes third exemplary coupler 43 at each end of upper longitudinal supporting bar 71, and fourth exemplary coupler 44 at each end of lower longitudinal supporting bar 72. Third exemplary coupler 43 and fourth exemplary coupler 44 help to hold longitudinal supporting bar unit 70 in first exemplary coupler 41 or second exemplary coupler 42, and consequently, help to stabilize the bed frame.

In various exemplary embodiments, a collapsible bed frame of the present invention includes one or more connectors disposed between adjacent frame units and configured to connect the adjacent frame units. For instance, by way of example, FIGS. 1 and 3 illustrate two first connectors 91 disposed between first frame unit 1 and second frame unit 2, and configured to connect first frame unit 1, second frame unit 2, and inner lateral bar unit 5. It should be noted that the two first connectors can be configured the same as or differently from each other.

In some exemplary embodiments, first exemplary connector 91 includes first, second and third pieces. Each of the second and third pieces is rotatably connected with the first piece. The first piece is fixedly connected with the first or second end of an inner lateral bar unit. The second piece is fixedly connected with the first or second end of the first frame unit, and the third piece is fixedly connected with the first or second end of the second frame unit.

Figure 4:
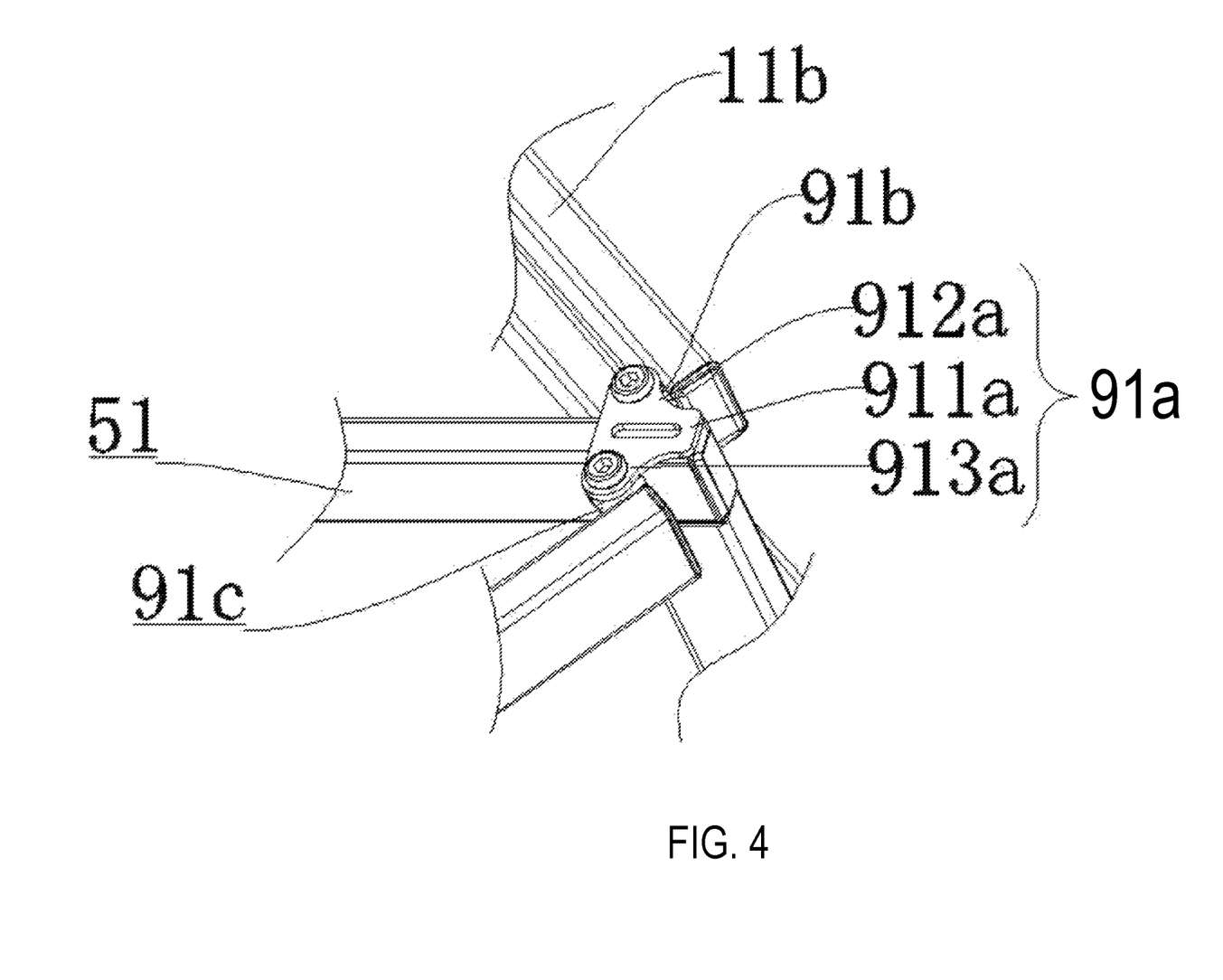
FIG. 4 is an enlarged view taken along circle B of FIG. 3.

For instance, by way of example, FIG. 4 illustrates first exemplary connector 91 including first piece 91*a*, second piece 91*b* and third piece 91*c*. First exemplary piece 91*a* includes affixing piece 911*a*, first extension 912*a* at a first side of the affixing piece and second extension 913*a* at a second side of the affixing piece. Second exemplary piece 91*b* is rotatably connected with first extension 912*a* of the first piece, and third piece 91*c* is rotatably connected with second extension 913*a* of the first piece.

The first or second end of exemplary inner lateral bar unit 5 is fixedly connected with affixing piece 911*a* of first piece 91*a*, for instance, by welding or any other suitable joining means. The first end of the first frame unit (e.g., an end of first longitudinal bar unit 120) or the second end of the first frame unit (e.g., an end of second longitudinal bar unit 130) is fixedly connected with second piece 91*b*, for instance, by welding or any other suitable means. Similarly, the first end of the second frame unit (e.g., an end of first longitudinal bar unit 220) or the second end of the second frame unit (e.g., an end of second longitudinal bar unit 230) is fixedly connected with third piece 91*c*, for instance, by welding or any other suitable means.

In some exemplary embodiments such as those illustrated in FIGS. 3 and 4, the first ends or the second ends of the first and second frame units (e.g., the ends of longitudinal bar units 120, 130, 220, 230) are disposed in an exterior side of the bed frame with respect to the second and third piece of the first connector. This allows the longitudinal bar units to rotate toward inner lateral bar unit 5 during contraction or away from inner lateral bar unit 5 during expansion while remaining on the first plane.

It should be noted that first connector 91 can be a single connector or a stack of two or more connectors. For instance, in some exemplary embodiments, such as those where an inner lateral bar unit or adjacent longitudinal bar unit is a stack of bars, first exemplary connector 91 can be a stack of connectors (having two, three or more connectors) corresponding in number to the stack of bars. For instance, by way of example, FIG. 3 illustrate exemplary inner lateral bar unit 5 having upper lateral bar 51 and lower lateral bar 52. Accordingly, exemplary first connector 91 includes a first upper connector and a first lower connector. The first upper connector connects upper lateral bar 51 with upper longitudinal bars of longitudinal bar units 120, 220 or 130, 230, while the first lower connector connects lower lateral bar 52 with lower longitudinal bars of longitudinal bar units 120, 220 or 130, 230.

In various exemplary embodiments, a collapsible bed frame of the present invention includes a plurality of second connectors configured to connect the outer lateral bar units with the first and second longitudinal bar units. It should be noted that any two of the second connectors can be configured the same as or differently from each other. In some exemplary embodiments, each second connector is configured to connect one end (e.g., the first or second end) of an outer lateral bar unit (e.g., first outer lateral bar unit 110 or second outer lateral bar unit 210) with one end of an adjacent longitudinal bar unit. In some exemplary embodiments, a second exemplary connector includes a body and a coupler rotatable with respect to the body. The body is connected or fixedly connected with the end of the outer lateral bar unit. The coupler is connected or fixedly connected with the end of the adjacent longitudinal bar unit.

By way of example, FIG. 3 illustrates a bed frame including second exemplary connector 30 to connect the first or second end of an outer lateral bar unit (e.g., the outer lateral bar unit 110 or second outer lateral bar unit 210) with an end of an adjacent longitudinal bar unit (e.g., longitudinal bar unit 130). For instance, in some exemplary embodiments, second exemplary connector 30 includes body 34 configured to connect or fixedly connect with the end of the outer lateral bar unit. In an exemplary embodiment, body 34 has a substantially cylindrical shape.

Second exemplary connector 30 also includes coupling part 34*a* disposed at body 34 and rotatable with respect to body 34. Exemplary coupling part 34*a* is configured to connect, and in some exemplary embodiments fixedly connect, the end of the adjacent longitudinal bar unit. In some exemplary embodiments, exemplary coupling part 34*a* includes linking part 341*a* and extension 341*b* extended from the linking part. Linking part 341*a* is disposed (e.g., fitted) at body 34, and rotatable along the axis of body 34. Extension 341*b* is hollow or formed with a recess to receive the end of the adjacent longitudinal bar unit. In an exemplary embodiment, extension 341*b* and the end of the adjacent longitudinal bar unit are further fastened together, for instance, by a fastener, welding, or any other suitable joining means.

Exemplary coupling part 34*a* can be a single coupling part or a stack of two or more coupling parts. In some exemplary embodiments such as those where the adjacent longitudinal bar unit (e.g., longitudinal bar unit 110) is a stack of bars that includes two or more bars, coupling part 34*a* itself can include two or more coupling parts, each for coupling with an end of one bar in the stack.

In various exemplary embodiments, a collapsible bed frame of the present invention includes a plurality of vertical bars disposed at longitudinal bar units at an interior side of the bed frame. The vertical is formed with a slot at its upper portion and configured to removably engage an end of a supporting bar.

Figure 5:
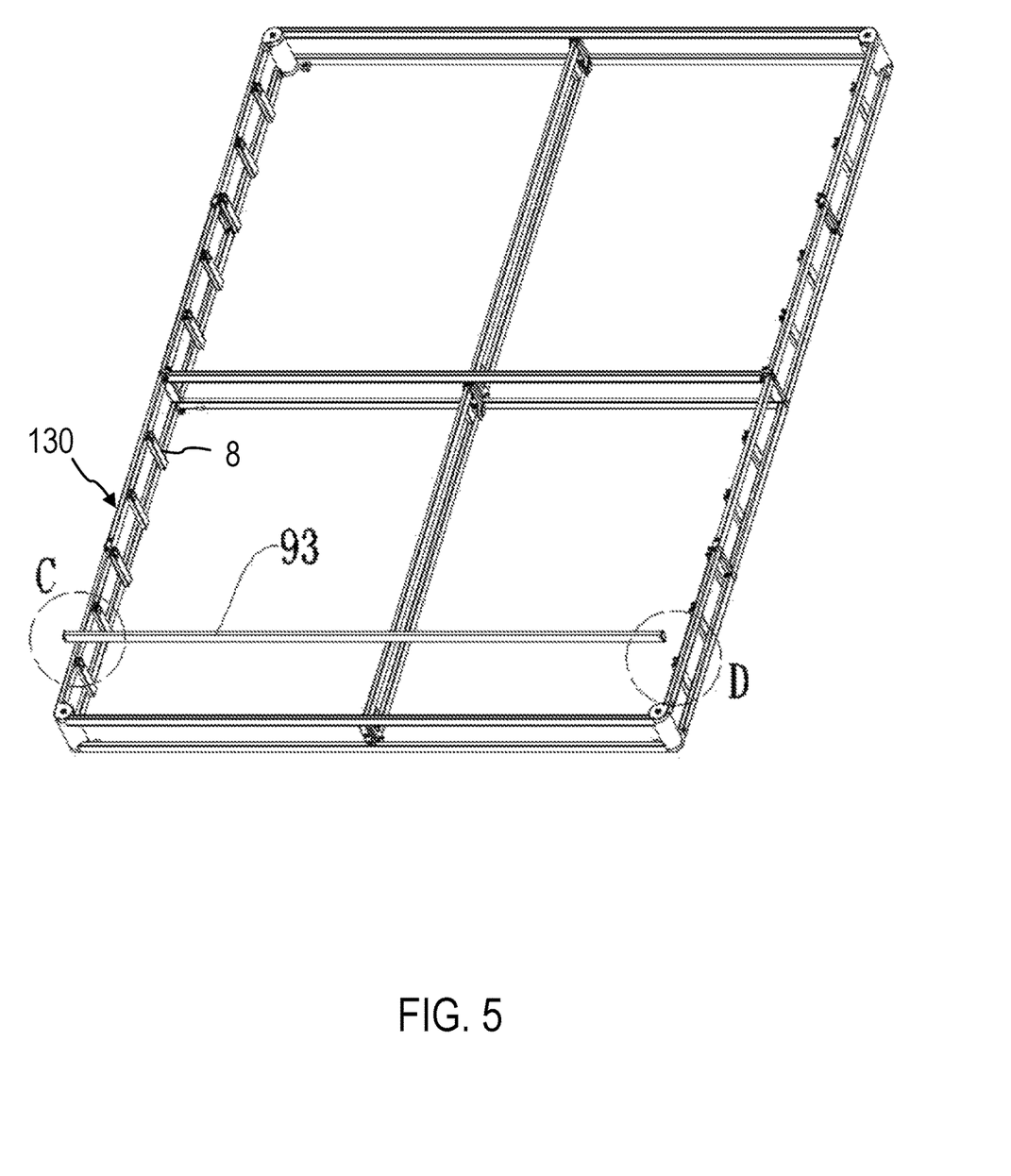
FIG. 5 is a partially disassembled perspective view illustrating an exemplary bed frame in an expanded state in accordance with exemplary embodiments of the present invention.
Figure 6A:
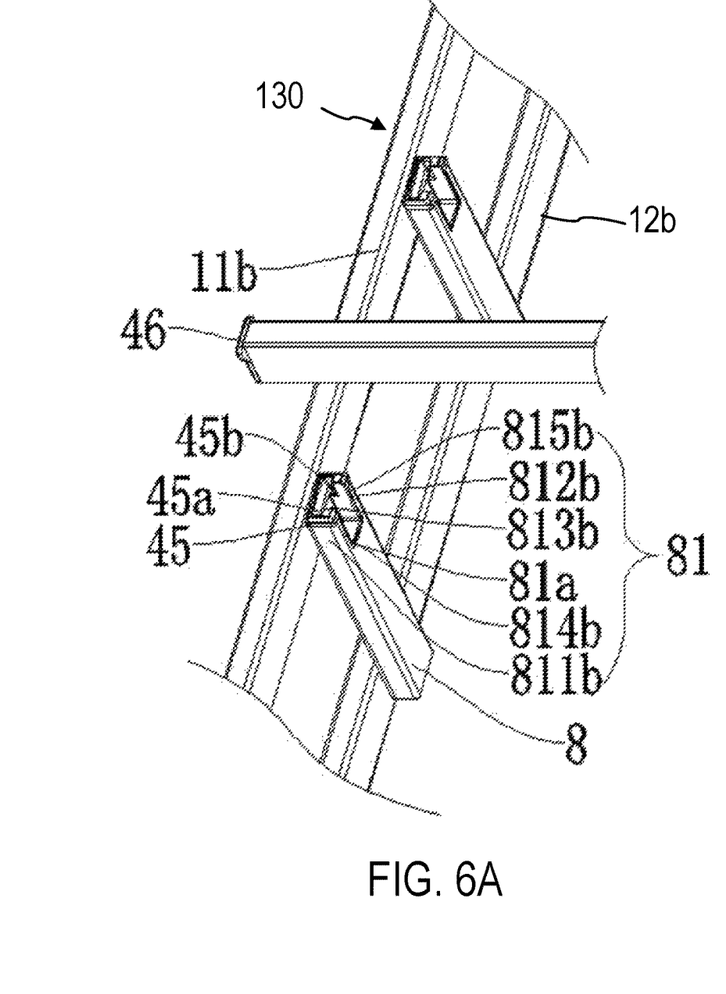
FIG. 6A is an enlarged view taken along circle C of FIG. 5.
Figure 6B:
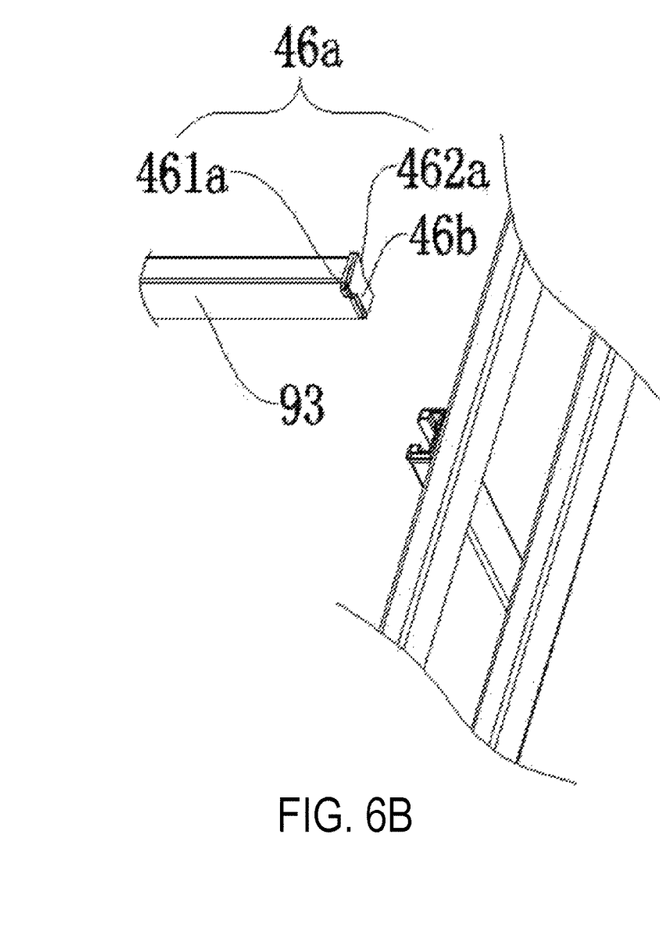
FIG. 6B is an enlarged view taken along circle D of FIG. 5.

For instance, by way of example, FIGS. 5 and 6 illustrate a collapsible bed frame including a plurality of fourth vertical bars 8 disposed at the first and second longitudinal bar units of the first and second frame units. Exemplary fourth vertical bar 8 has an upper end and a lower end. The upper end of exemplary fourth vertical bar 8 is connected with the upper longitudinal bar (e.g., upper longitudinal bar 11*b*) of the respective longitudinal bar unit (e.g., second longitudinal bar unit 130 of first frame unit 1). The lower end is connected with the lower longitudinal bar (e.g., upper longitudinal bar 12*b*) of the respective longitudinal bar unit.

In some exemplary embodiments, exemplary fourth vertical bar 8 is disposed at an interior side of the bed frame. Exemplary fourth vertical bar 8 is formed with a slot such as slot 81 at its upper portion. An exemplary coupler such as fifth exemplary coupler 45 is disposed in slot 81. Fifth exemplary coupler 45 is configured to removably engage an end of lateral supporting bar 93.

In some exemplary embodiments, slot 81 includes bottom 81*a*, first side wall 811*b*, second side wall 812*b*, third side wall 813*b*, first extension 814*b* and second extension 815*b*. The first side wall, the second side wall, the third side wall, the first extension and a second extension are extended upward from the bottom of slot 81. The first and second side walls are opposite to each other. The third side wall faces the upper longitudinal bar, and connects the first and second side walls. In an exemplary embodiment, the third side wall is fixed on the upper longitudinal bar by welding or any other suitable means. The first extension extends from the first side wall toward the second side wall. The second extension extends from the second side wall toward the first side wall. In an exemplary embodiment, the first and second extensions are spaced apart with an opening in between.

In some exemplary embodiments, fifth exemplary coupler 45 includes first notch 45*a* at a first side and second notch 45*b* at a second side of the fifth exemplary coupler. The first and second notches corresponds to the first and second extensions of the slot. In an exemplary embodiment, the first notch is shorter than the first extension, and the second notch is shorter than the second extension.

In some exemplary embodiments, corresponding to fifth exemplary coupler 45, each of the first and second ends of lateral supporting bar 93 includes coupler 46 to removably couple with the fifth exemplary coupler. In an exemplary embodiment, coupler 46 includes body 46*b* and one or more lugs 46*a*. By way of example, FIG. 6 illustrates two lugs, i.e., first lug 461*a* and second lug 462*a*. First lug 461*a* is configured to couple with first notch 45*a* of fifth coupler 45 and second lug 462*a* to couple with second notch 45*b* of fifth coupler 45.

Coupler 46 can be made of any suitable materials, including but not limited to metals (e.g., cast iron, steel, aluminum), composites and plastics. In an exemplary embodiment, coupler 46 is made of a metallic material and is fixed onto the end of the lateral supporting bar by welding, screwing or any other suitable means. In another exemplary embodiment, coupler 46 is made of a plastic material and is fixed onto the end of the lateral supporting bar by a fastener or any other suitable means.

In an exemplary embodiment, a collapsible bed frame of the present invention includes first frame unit 1, second frame unit 2, and a longitudinal bar unit. The longitudinal bar unit has one end removably connected with the first frame unit through a coupler (e.g., a plastic coupler) at the first frame unit, and the other end removably connected with the second frame unit through a coupler (e.g., a plastic coupler) at the second frame unit.

In another exemplary embodiment, a collapsible bed frame of the present invention includes more than two frame units, or more than three lateral bar units. For instance, a collapsible bed frame can include exemplary first outer lateral bar unit 110, second outer lateral bar unit 210, and two or more inner lateral bar units 5 disposed between the first and second outer lateral bar units. Of two adjacent lateral bars, a first longitudinal bar unit and a second longitudinal bar unit are rotatably with the two adjacent lateral bars, and a longitudinal supporting bar unit is removably connected with two adjacent lateral bars.

Typically, bars (e.g., lateral or longitudinal bars) of a bed frame are made of a metallic material and are often of a tubular shape. They often generate noises during installation and could be worn down quickly in use. The exemplary couplers of the present invention serve as cushions between the metallic bars. They reduces the noises, and the frictions between the bars. Moreover, they help to distribute the load evenly in one part or among different parts. Further, they help to enhance the strength of the connection between the bars. As such, the exemplary couplers of the present invention help to stabilize the bed frames and prolong the lifetime of the bed frames. In addition, in some exemplary embodiments, the notches of the fifth exemplary coupler are shorter than the extensions of the slot. As such, the lugs of the coupler can be easily inserted into or removed from the notches of the exemplary coupler, facilitating easy installation or removal of the supporting bars.

The collapsible bed frames of the present invention can contract and expand while the lateral and longitudinal bar units are connected with each other. As such, there is no need to assemble or disassemble these parts, and there is no need to carry tools such as screwdrivers and wrenches. Moreover, the sizes of the collapsible bed frames when contracted are reduced significantly. As such, they require less space for shipping, transportation and storage. Further, with the receptacles, the lateral and longitudinal supporting bar units can be easily installed or removed. As such, using a collapsible bed frame of the present invention to deploy a comfortable bed is not time consuming and does not require much effort.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will be understood that the terms "lower" or "upper", and etc. are used to describe features of the exemplary embodiments with reference to the positions of such features as displayed in the figures. It will be understood that, although the terms "first," "second," etc. may be used herein to describe various elements, these elements should not be limited by these terms. These terms are only used to distinguish one element from another. For example, a first longitudinal bar unit could be termed a second longitudinal bar unit, and, similarly, a second longitudinal bar unit could be termed a first frame, without changing the meaning of the description, so long as all occurrences of the "first longitudinal bar unit" are renamed consistently and all occurrences of the "second longitudinal bar unit" are renamed consistently.

What is claimed is:

1. A collapsible bed frame comprising:
a first frame unit and a second frame unit disposed side by side, each of the first and second units comprising an upper frame, a lower frame, a first vertical bar disposed between the upper and lower frames, and a first plastic coupler connected with the first vertical bar at an interior side of the first or second frame unit;
an inner lateral bar unit disposed between the first and second frame units, and comprising an upper inner lateral bar, a lower inner lateral bar, a second vertical bar disposed between the upper and lower inner lateral bar and at a position corresponding to the first vertical bar, and one or more second plastic couplers, wherein a second plastic coupler in the one or more second plastic couplers is connected with the second vertical bar at a side facing the first plastic coupler; and
one or more longitudinal supporting bar units, each removably connected with the inner lateral bar and one of the first and second frames through the first and second plastic couplers,
wherein
each longitudinal supporting bar unit comprises an upper longitudinal supporting bar, a lower longitudinal supporting bar, and one or more third vertical bars disposed between the upper and lower longitudinal supporting bars and connecting the upper and lower longitudinal supporting bars;
the first plastic coupler comprises a first upper receptacle to removably engage a first end of the upper longitudinal supporting bar, and a first lower receptacle to removably engage a first end of the lower longitudinal supporting bar;
the corresponding second plastic coupler comprises a second upper receptacle to removably engage a second end of the upper longitudinal supporting bar, and a second lower receptacle to removably engage a second end of the lower longitudinal supporting bar; and
the upper longitudinal supporting bar is longer than the lower longitudinal supporting bar, wherein each of the first and second plastic couplers comprises:
a recess formed at an upper portion of the first or second plastic coupler to serve as the first or second upper receptacle; and
a first side wall, a second side wall and a lower side wall at a lower portion of the first or second plastic coupler, and protruded in a longitudinal direction of the bed frame, wherein the first side wall, the second side wall and the lower side wall collectively serve as the first or second lower receptacle.

2. The collapsible bed frame of claim 1, wherein the first plastic coupler is fixed on the first vertical bar by a fastener.

3. The collapsible bed frame of claim 1, wherein the first or second end of the upper longitudinal supporting bar comprises a third plastic coupler configured to be removably disposed at the first or second upper receptacle, and the first or second end of the lower longitudinal supporting bar comprises a fourth plastic coupler configured to be removably disposed at the first or second lower receptacle.

4. The collapsible bed frame of claim 1, wherein:
the first and second frame units are rotatably connected with each other at proximal sides thereof;
each of the first and second frame units comprises an outer lateral bar unit, a first longitudinal bar unit, and a second longitudinal bar unit;
the first longitudinal bar unit is disposed at a first side of the bed frame and rotatably connected with a first end of the outer lateral bar unit;
the second longitudinal bar unit is disposed at a second side of the bed frame and rotatably connected with a first second end of the outer lateral bar unit;
each of the first and second longitudinal bar units comprises a first longitudinal segment unit and a second longitudinal segment unit rotatably connected with each other at proximal ends thereof; and
when in an intermediate state between contracted and expanded states, the first longitudinal bar units of the first and second frame units collectively form a substantially "W" shape, and the second longitudinal bar units of the first and second frame units collectively form another substantially "W" shape.

5. The collapsible bed frame of claim 1, further comprising a plurality of lateral supporting bars, wherein:
  each of the first and second frame units comprises an outer lateral bar unit, a first longitudinal bar unit, and a second longitudinal bar unit;
  the first longitudinal bar unit is disposed at a first side of the bed frame and connected with a first end of the outer lateral bar unit;
  the second longitudinal bar unit is disposed at a second side of the bed frame and connected with a second end of the outer lateral bar unit; and
  each lateral supporting bar in the plurality of lateral supporting bars has a first end removably connected with the first longitudinal bar unit of the first or second frame unit, and a second end removably connected with the second longitudinal bar unit of the first or second frame unit, wherein
    each of the first and second longitudinal bar units comprises an upper longitudinal bar, a lower longitudinal bar, and a plurality of fourth vertical bars disposed at an interior side of the bed frame and connected with the upper and lower longitudinal bars, wherein the upper longitudinal bar is part of the upper frame of the first or second frame unit, the lower longitudinal bar is part of the lower frame of the first or second frame unit, the first vertical bar is disposed at the outer lateral bar unit, and each fourth vertical bar in the plurality of fourth vertical bars is disposed at the first or second longitudinal bar unit;
    each fourth vertical bar is formed with a slot at an upper portion thereof;
    a fifth plastic coupler is disposed at the slot; and
    each of the first and second ends of a lateral supporting bar in the plurality of lateral supporting bars comprises a coupler having one or more lugs to removably couple with the fifth plastic coupler.

6. The collapsible bed frame of claim 5, wherein:
  the slot comprises a bottom, a first side wall, a second side wall, a third side wall, a first extension and a second extension, wherein
    the first side wall, the second side wall, the third side wall, the first extension and a second extension are extended upward from the bottom;
    the first and second side walls are opposite to each other;
    the third side wall faces the upper longitudinal bar, and connects the first and second side walls;
    the first extension extends from the first side wall toward the second side wall;
    the second extension extends from the second side wall toward the first side wall; and
    the first and second extensions are spaced apart with an opening in between;
  the fifth plastic coupler comprises a first notch at a first side and a second notch at a second side of the fifth plastic coupler, wherein the first and second notches correspond to the first and second extensions of the slot;
  the one or more lugs of the coupler comprises a first lug and a second lug to removably couple with the first and second notches of the fifth plastic coupler, respectively.

7. The collapsible bed frame of claim 6, wherein the first notch is shorter than the first extension, and the second notch is shorter than the second extension.

8. A collapsible bed frame comprising:
  a first frame unit and a second frame unit disposed side by side, each of the first and second units comprising an upper frame, a lower frame, a first vertical bar disposed between the upper and lower frames, and a first coupler connected with the first vertical bar at an interior side of the first or second frame unit, wherein the first coupler comprises an upper receptacle and a lower receptacle; and
  a longitudinal supporting bar unit comprising an upper longitudinal supporting bar, a lower longitudinal supporting bar, and one or more third vertical bars disposed between the upper and lower longitudinal supporting bars and connecting the upper and lower longitudinal supporting bars;
  wherein
  a first end of the upper longitudinal supporting bar is removably coupled with the upper receptacle of the first coupler of the first frame unit;
  a first end of the lower longitudinal supporting bar is removably coupled with the lower receptacle of the first coupler of the first frame unit;
  a second end of the upper longitudinal supporting bar is removably coupled with the upper receptacle of the first coupler of the second frame unit;
  a second end of the lower longitudinal supporting bar is removably coupled with the lower receptacle of the first coupler of the first frame unit; and
  the upper longitudinal supporting bar is longer than the lower longitudinal supporting bar, wherein the first coupler comprises:
    a recess formed at an upper portion of the first coupler to serve as the upper receptacle; and
    a first side wall, a second side wall and a lower side wall at a lower portion of the first coupler, and protruded in a longitudinal direction of the bed frame, wherein the first side wall, the second side wall and the lower side wall collectively serve as the lower receptacle.

9. A collapsible bed frame comprising:
  a first lateral bar unit and a second lateral bar unit substantially parallel to each other, wherein
    the first lateral bar unit comprises a first upper lateral bar, a first lower lateral bar, a first vertical bar disposed between the first upper and lower lateral bars, and a first coupler connected with the first vertical bar at a side facing the second lateral bar unit; and
    the second lateral bar unit comprises a second upper lateral bar, a second lower lateral bar, a second vertical bar disposed between the second upper and lower lateral bars and at a position corresponding to the first vertical bar, and a second coupler connected with the second vertical bar at a side facing the first lateral bar unit;
  a first longitudinal bar unit disposed at a first side of the bed frame, and having a first end connected with a first end of the first lateral bar unit and a second end connected with a first end of the second lateral bar unit;
  a second longitudinal bar unit disposed at a second side of the bed frame, and having a first end connected with a second end of the first lateral bar unit and a second end connected with a second end of the second lateral bar unit; and
  a first longitudinal supporting bar unit comprising a first upper longitudinal supporting bar, a first lower longitudinal supporting bar, and one or more third vertical bars disposed between the first upper and lower longitudinal supporting bars and connecting the first upper and lower longitudinal supporting bars;

wherein
the first coupler comprises a first upper receptacle to removably engage a first end of the first upper longitudinal supporting bar, and a first lower receptacle to removably engage a first end of the first lower longitudinal supporting bar;
the second coupler comprises a second upper receptacle to removably engage a second end of the first upper longitudinal supporting bar, and a second lower receptacle to removably engage a second end of the first lower longitudinal supporting bar; and
the first upper longitudinal supporting bar is longer than the first lower longitudinal supporting bar, wherein each of the first and second couplers comprises:
a recess formed at an upper portion of the first or second coupler to serve as the first or second upper receptacle; and
a first side wall, a second side wall and a lower side wall at a lower portion of the first or second coupler, and protruded in a longitudinal direction of the bed frame, wherein the first side wall, the second side wall and the lower side wall collectively serve as the first or second lower receptacle.

10. The collapsible bed frame of claim 9, wherein the first and second couplers are made of a material comprising plastic.

11. The collapsible bed frame of claim 9, wherein the first or second end of the first upper longitudinal supporting bar comprises a third coupler configured to be removably disposed at the first or second upper receptacle, and the first or second end of the first lower longitudinal supporting bar comprises a fourth coupler configured to be removably disposed at the first or second lower receptacle.

12. The collapsible bed frame of claim 9, wherein:
each of the first and second longitudinal bar units is rotatably connected with the first and second lateral bar units; and
each of the first and second longitudinal bar units comprises a first longitudinal segment unit and a second longitudinal segment unit rotatably connected with each other at proximal ends thereof;
wherein the proximal ends of the first and second longitudinal segment units of the first longitudinal bar unit and the proximal ends of the first and second longitudinal segment units of the second longitudinal bar unit move toward each other during contraction and move away from each other during expansion.

13. The collapsible bed frame of claim 9, further comprising a plurality of lateral supporting bars, each having a first end removably connected with the first longitudinal bar unit, and a second end removably connected with the second longitudinal bar unit, wherein
each of the first and second longitudinal bar units comprises an upper longitudinal bar, a lower longitudinal bar, and a plurality of fourth vertical bars disposed at an interior side of the bed frame and connected with the upper and lower longitudinal bars;
each fourth vertical bar is formed with a slot at an upper portion thereof;
a fifth coupler is disposed at the slot; and
each of the first and second ends of a lateral supporting bar in the plurality of lateral supporting bars comprises a coupler having one or more lugs to removably couple with the fifth coupler.

14. The collapsible bed frame of claim 13, wherein:
the slot comprises a bottom, a first side wall, a second side wall, a third side wall, a first extension and a second extension, wherein
the first side wall, the second side wall, the third side wall, the first extension and a second extension are extended upward from the bottom;
the first and second side walls are opposite to each other;
the third side wall faces the upper longitudinal bar, and connects the first and second side walls;
the first extension extends from the first side wall toward the second side wall;
the second extension extends from the second side wall toward the first side wall; and
the first and second extensions are spaced apart with an opening in between;
the fifth coupler comprises a first notch at a first side and a second notch at a second side of the fifth coupler, wherein the first and second notches correspond to the first and second extensions of the slot;
the one or more lugs of the coupler comprises a first lug and a second lug to removably couple with the first and second notches of the fifth coupler, respectively.

15. The collapsible bed frame of claim 14, wherein the first notch is shorter than the first extension, and the second notch is shorter than the second extension.

16. The collapsible bed frame of claim 9, further comprising:
a third lateral bar unit disposed at a side of the second lateral bar unit opposite to the first lateral bar unit, and substantially parallel to the first and second lateral bar units, wherein
the third lateral bar unit comprises a third upper lateral bar, a third lower lateral bar, a sixth vertical bar disposed between the third upper and lower lateral bars, and a sixth coupler connected with the sixth vertical bar at a side facing the second lateral bar unit; and
the second lateral bar unit further comprises another second coupler connected with the second vertical bar at a side facing the third lateral bar unit;
a third longitudinal bar unit disposed at a first side of the bed frame, and having a first end connected with a first end of the third lateral bar unit and a second end connected with a first end of the second lateral bar unit;
a fourth longitudinal bar unit disposed at a second side of the bed frame, and having a first end connected with a second end of the third lateral bar unit and a second end connected with a second end of the second lateral bar unit; and
a second longitudinal supporting bar unit comprising a second upper longitudinal supporting bar, a second lower longitudinal supporting bar, and one or more third vertical bars disposed between the second upper and lower longitudinal supporting bars and connecting the second upper and lower longitudinal supporting bars;
wherein the second longitudinal supporting bar unit is removably coupled with the second and third lateral bar units through the another second coupler at the second lateral bar unit and the sixth coupler at the third lateral bar unit.

17. The collapsible bed frame of claim 16, wherein the third lateral bar unit is substantially the same as the first lateral bar unit or substantially the same as the second lateral bar unit, and the third longitudinal bar unit is substantially the same as the first longitudinal bar unit, and the fourth longitudinal bar unit is substantially the same as the second longitudinal bar unit.

18. The collapsible bed frame of claim 17, wherein:
each of the first and second longitudinal bar units is rotatably connected with the first and second lateral bar units;
each of the third and fourth longitudinal bar units is rotatably connected with the second and third lateral bar units;
each of the first, second, third, fourth longitudinal bar units comprises a first longitudinal segment unit and a second longitudinal segment unit rotatably connected with each other at proximal ends thereof;
wherein in an intermediate state between contracted and expanded states, the first and third longitudinal bar units collectively form a substantially "W" shape, and the second and fourth longitudinal bar units collectively form another substantially "W" shape.

19. The collapsible bed frame of claim 8, wherein the first and second frame units are rotatably connected with each other at proximal sides thereof.

20. The collapsible bed frame of claim 8, further comprising a plurality of lateral supporting bars, wherein:
each of the first and second frame units comprises an outer lateral bar unit, a first longitudinal bar unit, and a second longitudinal bar unit;
the first longitudinal bar unit is disposed at a first side of the bed frame and connected with a first end of the outer lateral bar unit;
the second longitudinal bar unit is disposed at a second side of the bed frame and connected with a second end of the outer lateral bar unit; and
each lateral supporting bar in the plurality of lateral supporting bars has a first end removably connected with the first longitudinal bar unit of the first or second frame unit, and a second end removably connected with the second longitudinal bar unit of the first or second frame unit, wherein
each of the first and second longitudinal bar units comprises an upper longitudinal bar, a lower longitudinal bar, and a plurality of fourth vertical bars disposed at an interior side of the bed frame and connected with the upper and lower longitudinal bars, wherein the upper longitudinal bar is part of the upper frame of the first or second frame unit, the lower longitudinal bar is part of the lower frame of the first or second frame unit, the first vertical bar is disposed at the outer lateral bar unit, and each fourth vertical bar in the plurality of fourth vertical bars is disposed at the first or second longitudinal bar unit;
each fourth vertical bar is formed with a slot at an upper portion thereof;
a fifth plastic coupler is disposed at the slot; and
each of the first and second ends of a lateral supporting bar in the plurality of lateral supporting bars comprises a coupler having one or more lugs to removably couple with the fifth plastic coupler.

* * * * *